United States Patent [19]
Berriman

[11] 3,741,240
[45] June 26, 1973

[54] FLUID COMPENSATOR VALVE
[75] Inventor: Lester P. Berriman, Irvine, Calif.
[73] Assignee: Dresser Industries, Inc., Dallas, Tex.
[22] Filed: Aug. 2, 1971
[21] Appl. No.: 168,233

Related U.S. Application Data
[63] Continuation-in-part of Ser. No. 151,373, June 9, 1971, which is a continuation-in-part of Ser. No. 17,076, March 6, 1970, abandoned.

[52] U.S. Cl. .................................. 137/483, 137/495
[51] Int. Cl. ............................................. F16k 31/14
[58] Field of Search ..................... 139/495, 51, 482, 139/483, 509, 510

[56] References Cited
UNITED STATES PATENTS
3,039,485  6/1962  Brohl ............................... 137/483
2,068,938  1/1937  Viel .................................. 137/482
2,650,081  8/1953  Rockwell ....................... 137/483 X Primary Examiner—Henry T. Klinksiek
Assistant Examiner—Robert J. Miller
Attorney—Robert W. Mayer, Daniel Rubin et al.

[57] ABSTRACT

A compensator valve for dispensing a metered fluid supply to utilization apparatus in response to integrated demands imposed by different operational variables of the apparatus. Pressurized fluid received at an inlet is throttled by a spring biased valve as the fluid flows toward a discharge outlet. A sealed chamber juxtaposed to the valve includes an inlet for a connection of vacuum which acts to alter the effective valve bias in accordance with the magnitude of vacuum applied.

11 Claims, 6 Drawing Figures

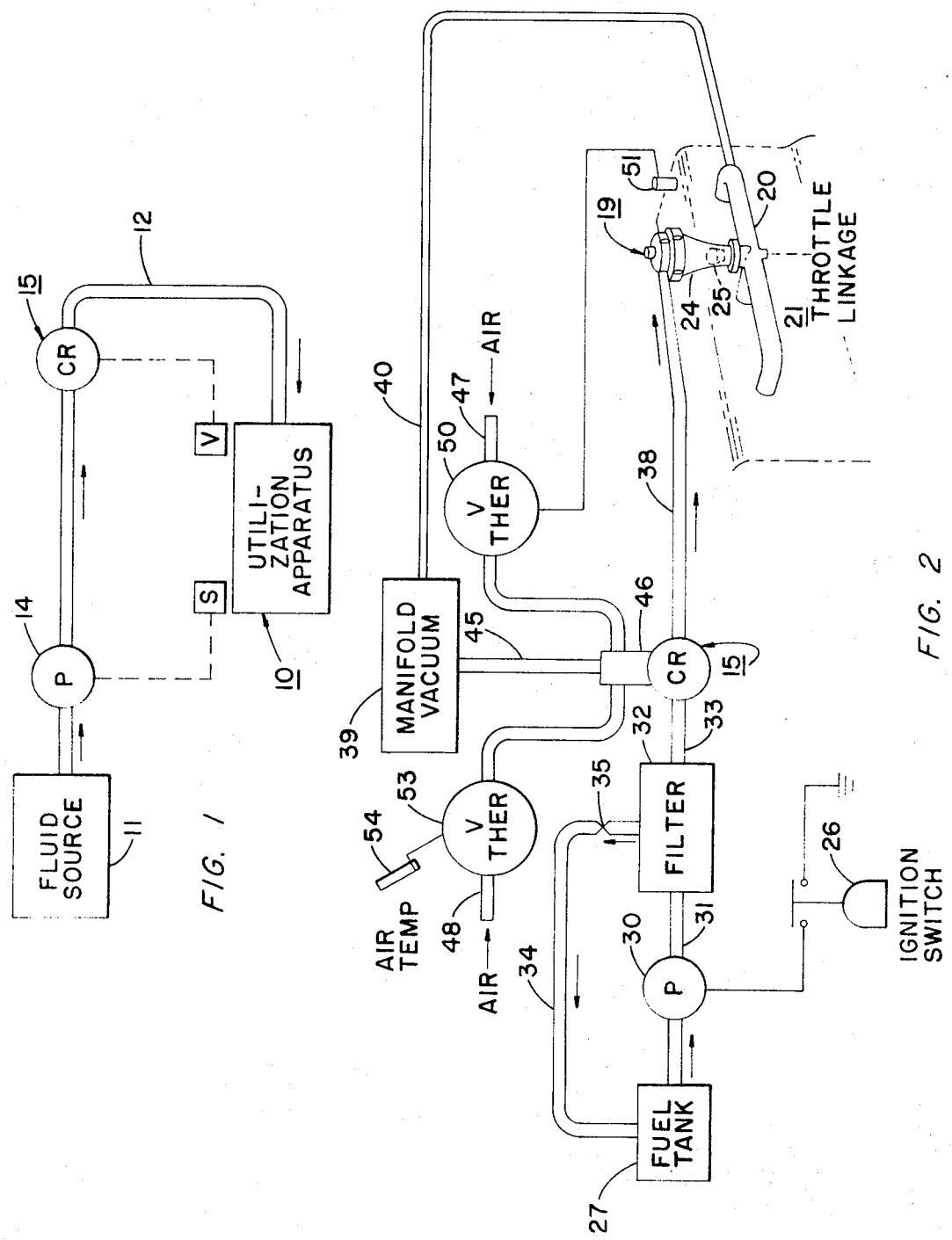

LESTER P. BERRIMAN
INVENTOR
BY Daniel Rubin
ATTORNEY

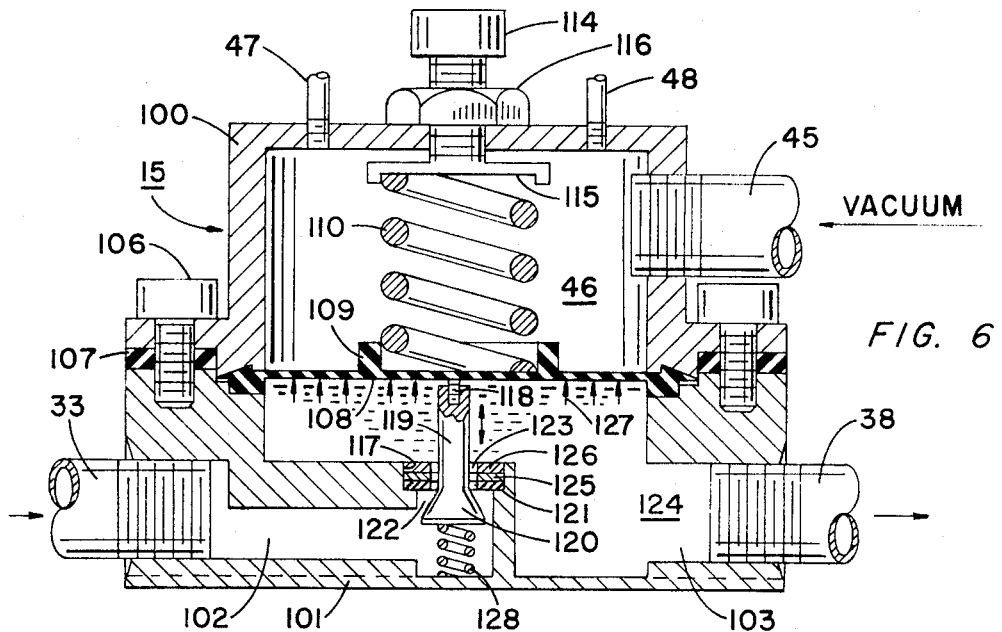
FIG. 6
FIG. 5
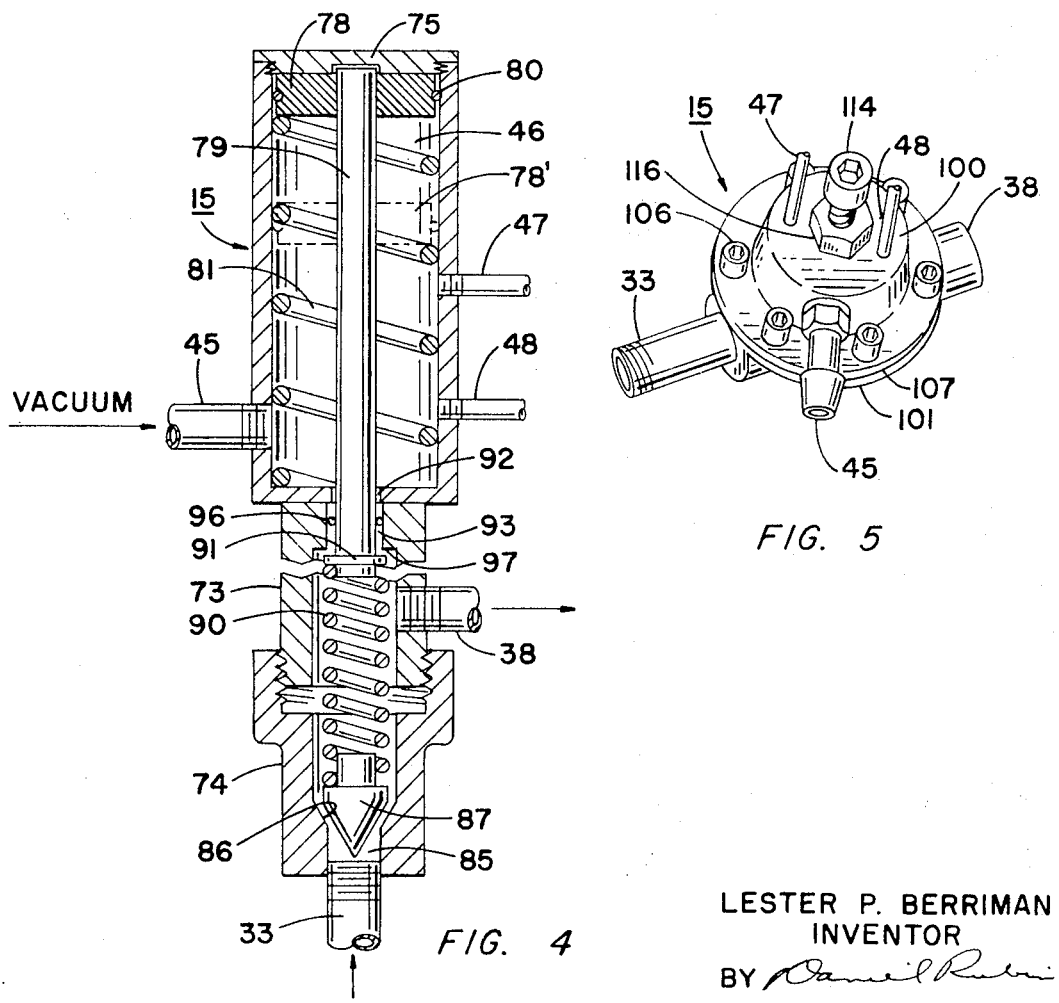
FIG. 4
LESTER P. BERRIMAN
INVENTOR
BY Daniel Rubin
ATTORNEY

FLUID COMPENSATOR VALVE

CROSS-REFERENCE TO RELATED APPLICATION

This application is a continuation-in-part of application Ser. No. 151,373, filed June 9, 1971 entitled "Method and Apparatus for Mixing and Modulating Liquid Fuel and Intake Air for an Internal Combustion Engine" which is a continuation-in-part of abandoned application Ser. No. 17,076, filed Mar. 6, 1970 and similarly entitled.

BACKGROUND OF THE INVENTION

1. The field of art to which the invention pertains includes the art of metered fluid dispensing and more particularly to such art as it applies to valve structures for proportioning fluid flow in response to operational demands of remote fluid utilization apparatus.

2. Valves for automatic fluid metering in varying quantities to meet operational requirements of apparatus are widely known. In a customary application for such valves, they function in response to a single variable on which the dispensed fluid quantities depend. Alternatively, another form of valve functions from a single signal remotely integrated from two or more variables. Typical uses of the latter form are in space conditioning in which temperature or humidity requirements may impose different and/or overriding demands on the valve. Therefore, while such valves are available in many sizes, shapes and forms it has not been heretofore known how to construct such valves to per se integrate demands of different operational variables in order to effectively meter fluid quantities being dispensed.

Specifically exemplifying need for an integrated signal response is a mixing and modulating device for supplying an air-fuel mixture to an internal combustion engine and disclosed in the cross referenced application incorporated herein by reference. Fuel requirements for internal combustion engines are well known to be an integrated function of both speed and load to which the engine is operationally subjected. With a conventional carburetor, such demands are normally met by an integral combination of cooperating components responsive to the varying operating conditions. Such components are not utilized on the said mixing and modulating device which instead has heretofore depended on metered fuel quantities to be supplied via a combination of separate apparatus components located remote and external thereto.

SUMMARY

This invention relates to valve apparatus for metered dispensing of fluid in integrated response to separate demand variables of apparatus to which the fluid is to be supplied. In one such utilization, the compensating valve hereof is employed in conjunction with a mixing and modulating device, as disclosed in the cross referenced application, to meter liquid fuel quantities to the operational requirements of an internal combustion engine.

For the latter purpose, the compensator valve of the invention is installed in the fuel line downstream of the fuel pump intermediate the fuel pump and the mixing and modulating apparatus which delivers an atomized mixture to the engine. Fuel flow rate is governed by the fuel pump providing an output which varies as a function of engine speed. With a reciprocably operable fuel pump the compensator acts to throttle the pulsating pump flow by a floating valve that is spring biased in opposition to flow. At the same time, manifold vacuum connected to a chamber contiguous to the valve acts to alter the effective spring force and hence its biasing force against the valve in accordance with the magnitude of vacuum applied. With an electric type fuel pump providing an essentially fixed pressure output, the compensator regulates flow by a valve operatively connected to a spring biased diaphragm opposed by fluid pressure. A vacuum connection enables a vacuum supply to similarly alter the effective bias against the diaphragm. By either of these means therefore, dispensed fuel quantities are metered as a function of both engine speed and load as reflected by the integrated effect of spring force and vacuum level in the intake manifold. Since the valve integrates its own metered response, the combination of multiple components previously required for these purposes is thereby eliminated.

It is therefore an object of the invention to provide a novel valve construction for metered dispensing of fluid in correlated response to the integrated demands imposed by an apparatus to which the fluid is supplied.

It is a further object of the invention to provide a novel valve construction for metered dispensing of liquid fuel requirements in response to the operating demands of an internal combustion engine.

It is a still further object of the invention to provide a valve construction as in the aforesaid objects which is both economical to fabricate and reliable in performance as to eliminate a combination of multiple components previously required for such purposes.

BRIEF DESCRIPTION OF THE DRAWINGS

FIG. 1 is a schematic representation of a fluid supply system in simple form incorporating a valve hereof for metering dispensed fluid quantities to utilization apparatus;

FIG. 2 is a schematic representation of a first system embodiment incorporating a valve hereof for supplying liquid fuel requirements to an internal combustion engine;

FIG. 4 is a sectional elevation of a compensator valve embodiment as employed in the system of FIG. 2;

FIG. 5 is an isometric exterior view of a compensator valve embodiment as employed in the system of FIG. 3; and FIG. 6 is a sectional elevation through the valve embodiment of FIG. 5.

Referring now to FIG. 1, there is shown a hypothetical utilization apparatus 10 adapted to receive a quantity of fluid from a source 11 through a connected conduit 12. Whether the received fluid is consumed or passed by the apparatus, the flow quantities are governed by modulating demand variables represented as "S" and "V", which for purposes of discussion can be regarded as "speed" and "vacuum" respectively. As schematically represented, signal S controls a pump 14 which acts to modulate the flow rate in proportion to the level of its received signal. The pump output is in turn throttled by a compensator valve 15 in accordance herewith acting to oppose received flow for dispensing to apparatus 10. Depending on whether or not changes in vacuum signal to valve 15 are intended to be direct or reverse acting with respect to operatively effecting increased or decreased throttling, the effective spring bias will either be aided or opposed by relative vacuum levels supplied thereto.

Referring now to FIG. 2, there is shown a form of fuel supply system for use in combination with a mixing and modulating apparatus 19 supported on an intake manifold 20 of an internal combustion engine 21 illustrated in phantom outline. Mixing and modulating device 19 is of a type more completely disclosed in the cross referenced application hereof and generally comprises a more or less cylindrical housing 24 internally containing an axially moveable pintle 25 which is operable by the throttle linkage. Fuel received at the device passes through a converging throat with which the pintle cooperates for atomizing the liquid fuel into a combustible air-fuel mixture passed into manifold 20.

Figure 3:
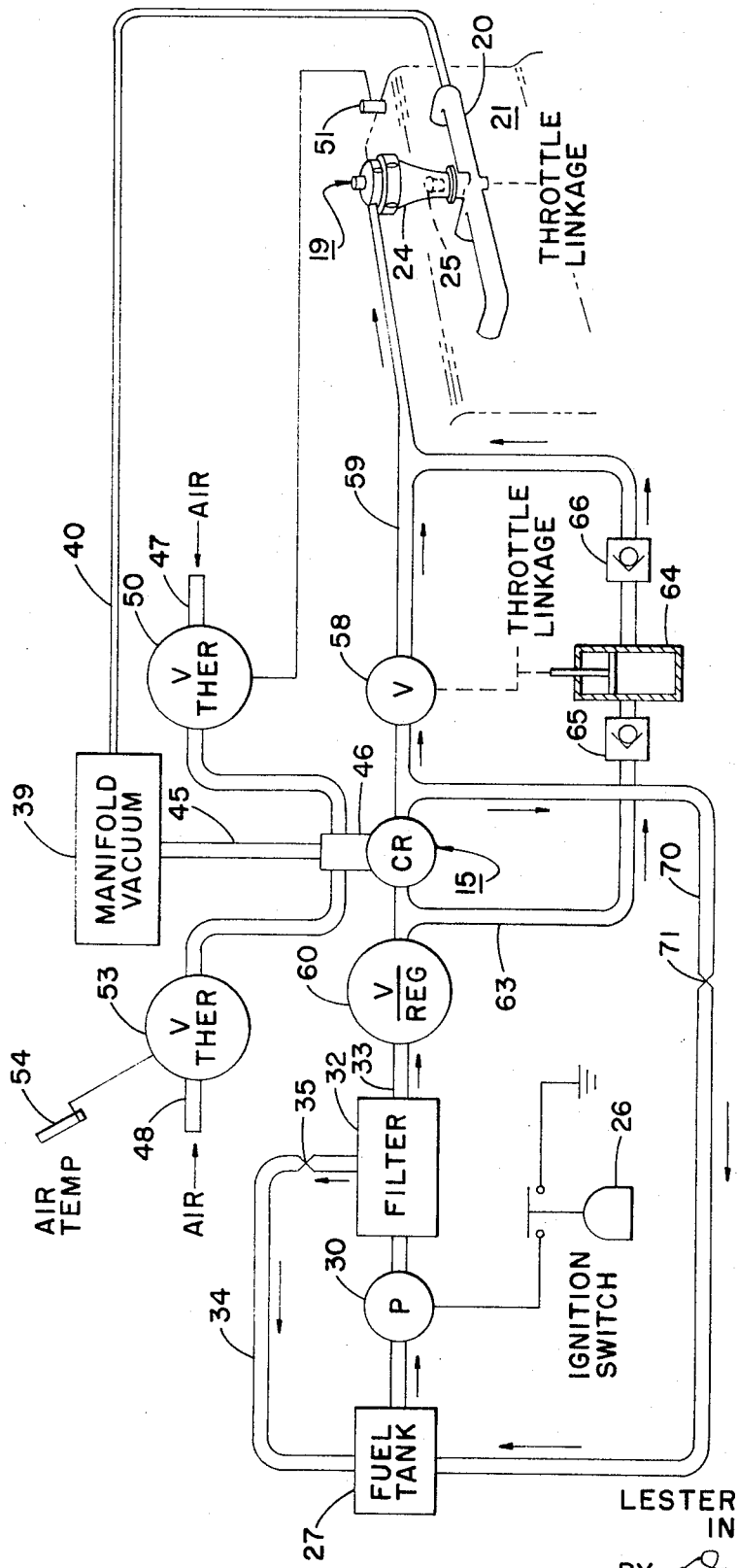
FIG. 3 is a schematic representation of a second system embodiment for supplying liquid fuel requirements to an internal combustion engine.

Turning on ignition switch 26 causes fuel to be drawn from tank 27 by reciprocating fuel pump 30 to produce a pulsed fuel supply in line 31 feeding into filter 32. Depending on consumption, filtered fuel is either discharged into line 33 or recycled via line 34 past constriction 35 to tank 27. The ultimate flow rate is of course dictated by the requirements of engine 21. Consequently, the output of pump 30 into valve 15, as will be described, is directly correlated with engine speed and in response to an increase in speed valve 15 operates to dispense increased fuel quantities into discharge line 38. On the other hand, should load be increased rather than speed there results a decreased manifold vacuum (higher absolute pressure) in receiver 39 communicating with manifold 20 by means of conduit 40. This change in vacuum level is instantly relayed through conduit 45 into an otherwise sealed chamber 46 of valve 15. The effect of reduced vacuum thereat is operative, as will be explained, to relax or relieve the imposed throttling resistance to flow to likewise enable increased fluid discharge into line 38.

Also communicating with chamber 46 are an optional pair of auxiliary air bleeds 47 and 48 which afford further operating refinements to the system via valve 15. For this purpose bleed 47 includes a thermostatically controlled valve or the like 50 having a bulb sensor or suitable bimetallic element 51 located to sense engine temperature. In this arrangement valve 50 opens on cold startup and gradually closes as the engine warms up to operating temperature. Similarly, bleed 48 includes a thermostatically controlled valve 53 having a sensor bulb or suitable bimetallic element 54 located to sense the temperature of air intake to mixing and modulating device 19. In the event of an air intake temperature below optimum, irrespective of whether the engine is warm or cold, bulb 54 causes valve 53 to open a proportionate amount. Increasing the opening of either or both air bleeds, results in a reduced effective vacuum level in chamber 46 enabling increased fuel flow by virtue of the aforementioned decreased throttling effect.

The embodiment of FIG. 3 represents a variation of fuel feed system to engine 21 in which a flow sensitive needle valve 58 under control of the throttle linkage is located in fuel feed line 59 directly preceeding fuel introduction into mixing and modulating device 19. In this arrangement a pressure regulator 60 is situated in filter output line 33 for providing a pressure regulated flow input from electric fuel pump 30 to compensator valve 15. A bypass line 63 serves to circumvent valve 15 and introduces fuel into delivery line 59 at a location intermediate needle valve 58 and mixing and modulating device 19. Included in bypass 63 is a pressure accumulator 64 positioned between a pair of spring loaded check valves 65 and 66. The function of bypass 63 is more fully described in the cross referenced application hereof, but generally provides supplementary fuel quantities during periods of acceleration. A return loop 70 including an orifice constriction 71 returns excess fuel to fuel tank 27.

Referring now to FIG. 4 there is shown the embodiment of compensator valve 15 utilized in the fuel feed system of FIG. 2. For this embodiment, valve 15 is comprised of an elongated tubular housing having an upper section 73 telescopically threaded into a lower section 74. The housing in turn is connected as by brazing, welding or the like to cylindrical chamber 46 enclosed generally pressure tight by virtue of a screwed cap 75 at its opposite end remote from the housing.

Within chamber 46 there is provided an annular piston 78 secured to an axially arranged piston rod 79 extending to inward of housing section 73 through coaxial apertures 92 and 93. Piston 78 is adapted for axial movement within the chamber in a pressure sealed relation to the housing wall afforded by annular O-ring seal 80. A spring 81, coiled about rod 79 and compressed between the underface of piston 78 and the lower end wall of chamber 46, acts to urge piston 79 toward its uppermost illustrated position against cap 75. Communicating with the interior of chamber 46 is manifold vacuum supplied via conduit 45 and if desired, auxiliary air bleeds 47 and 48.

Liquid fuel is supplied through line 33 threadably connected into an inlet 85 at the remote under end of lower housing section 74. Merging upward therefrom, the inlet is chamfered outwardly to form an annular tapered seat 86. Cooperating with seat 86 is a conically ended floating plug 87 which with the seat defines a fluid flow throttling passage therebetween to discharge outlet 38. The plug is of reduced diameter at its topside to receive one end of a compressed coil spring 90, the other end of which engages a flange 91 on the lower end of piston rod 79. An annular O-ring 96 situated about rod 79 in aperture 93 provides a pressure-tight seal thereat while housing shoulder 97, in the path of flange 91 alternatively defines the upper travel limit for the rod. In this manner, spring 90 urges plug 87 toward seat 86 to operate as a spring loaded check valve and effectively throttle the pulsed flow input received at inlet 85. A desired increase or decrease in throttling action can be pre-set by the axially threaded relation of housing section 74 on 73 acting to compress or relax spring 90 as appropriate. The exact spring rates are not critical except to the extent they are to afford compatible operation with the vacuum levels supplied to chamber 46.

Operation for the valve embodiment of FIG. 4 consists of receiving pulsed fuel flow in line 33 that is constantly opposed and throttled by the action of plug 87. With relatively high vacuum on the order of 15 inches Hg (low absolute pressure at relatively loadless engine) applied in conduit 45, piston 78 is drawn downward to the position showned dashed and designated 78'. Conjoint downward movement of rod 79 increases compression of spring 90 to consequently increase throttling resistance to flow imposed by plug 87. This represents a condition generally set to accommodate steady state no load driving. On encountering a reduction in vacuum to on the order of 5 inches Hg (higher absolute pressure relatively loaded engine) piston 78 is restored by the action of spring 81 toward its uppermost position to in turn relax spring 90. The latter effect concomitantly enables greater quantities of fuel flow past throttling plug 87 to discharge outlet 38. Opening of air bleeds 47 and/or 48 effectively neutralizes in whole or in part the vacuum applied via conduit 45 to similarly relax spring 90 for increasing fuel flow.

Reference is now made to FIGS. 5 and 6 disclosing the second compensator valve embodiment in accordance herewith as employed in the system of FIG. 3. In this embodiment valve 15 comprises upper and lower die cast housing sections 100 and 101 respectively, the latter of which includes a fuel inlet 102 to which line 33 is connected and a discharge outlet 103 to which line 38 is connected. Securing the housing sections together are a plurality of peripherally located angularly displaced bolts 106 compressing an annular gasket 107 to form a leak-tight relation thereabout. Also secured by being peripherally gripped between the upper and lower housing sections is a thin metal flexible diaphragm 108 having on its upper face a rubber boot or sleeve 109 centrally recessed to receive the lower end of compressed coil spring 110. The latter spring acts to urge diaphragm 108 in a downward direction with a force which can be preset by means of an adjustment knob 114. The knob is threadedly secured outward of the housing by locknut 116 and has a flange 115 engaging the upper end of spring 110.

Depending downwardly from the underside of diaphragm 108 is a short threaded stud 118 on which elongated coaxial pin 119 is threadedly mounted. At the opposite end pin 119 integrally enlarges to a frusto-conical plunger or cone 120. Supported surrounding pin 119 immediately above cone 120 is an assembled unit press fit into counterbore 117 and consisting of O-ring washer 121, a juxtaposed disc washer 125 and spring fit lock washer 126. Each of these latter elements include a central aperture 123 of diameter sufficiently larger than pin 119 to enable relatively free fluid flow from port 122 to chamber 124. In this manner, positioned movement of cone 120, as will be explained, cooperates with washer 121 to selectively restrict aperture 123 and effect flow regulation. A small coil spring 128 of relatively low spring rate as compared to spring 110 urges plunger 120 upwardly for the purpose of seating cone 120 against O-ring 121 until aperture 123 is completely closed to flow. In this arrangement therefore, the throttling force is imposed by the compression extent of spring 110 which can be preset as required via the threaded position of knob 114.

In operation of this valve embodiment, fuel flow received at inlet 102 is normally passed through aperture 123 into chamber 124 to apply an upward fluid force against the underside of diaphragm 108 as shown by arrows 127. In this manner the upwardly reacting fluid forces are opposing the downward force being exerted by spring 110 until a balance or equilibrium condition is achieved. This condition when attained effects the axial throttle setting of cone 120 relative to aperture 123 to selectively limit available fuel pressure in chamber 124. Also contributing to the balance of forces is the magnitude of vacuum applied at 45 acting to aid the fluid forces and oppose spring 110 by upward drawing of diaphragm 108.

Under steady state driving conditions, the relatively high magnitude of vacuum applied at 45 acts to effect maximum upward draw of diaphragm 108. This tends to decrease or minimize opening of port 123 sufficient to sustain driveability with a decreased pressure in discharge line 38. Conversely, a reduction in the magnitude of applied vacuum, as with an encountered engine load, enables spring 110 to exert its maximum downward force against diaphragm 108 for descending cone 120 to its maximum extent. This enables increased flow through aperture 123 thereby increasing obtainable pressure in discharge line 38. It is to be remembered in connection with this embodiment that as used in the system of FIG. 3 final fuel regulation to mixing and modulating device 19 is by virtue of throttle controlled needle valve 58 in combination with the flow afforded through bypass 63. Whereas for those purposes this embodiment of valve 15 acts as a pressure limitor in dispensing fuel into discharge line 38, it can obviously be used or readily adapted for pulsed supply in the manner of FIG. 2 as well as with various other well known forms of speed control.

By the above description, there is disclosed a novel compensator valve for dispensing metered fluid supply to utilization apparatus in response to integrated demands imposed by different operational variables of the apparatus. In accordance herewith, one of the variables is responded to by a spring bias pre-set to directly apply a desired throttling force in opposition to fluid flow. One or more of the other variables act through a vacuum chamber to appropriately increase or decrease the effective spring throttling force as required. Consequently, the discrete signals of the individual variables are effectively integrated in the ultimately imposed spring bias enabling fluid flow in accordance with operational demands of the apparatus to which it is supplied. The device is both simple in construction and yet highly reliable in performance as to eliminate the complexity and multiplicity of individual units previously combined for obtaining similar objectives in accordance with the prior art. Hence, the device hereof fulfills a long felt need in providing integrated performance for dispensing metered fluid flow subject to fluctuating flow rate requirements. Whereas "vacuum" has been prominently mentioned as a preferred form of signal transmission from one or more of the variables, it is obvious that other forms of pneumatic signals could be similarly utilized with appropriate changes in construction.

Since many changes could be made in the above construction and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privilege is claimed are defined as follows:

1. A valve for the metered dispensing of fluid flow comprising in combination:
   a. a housing defining a fluid flow passage between an inlet and an outlet;
   b. connecting means at said inlet for receiving a pressurized supply of fluid flow to be dispensed;
   c. throttle means located in said passage for regulating total fluid flow to said housing outlet;

d. an adjustably presettable biasing member adapted to operate said throttle means as a function of a first demand variable;

e. a pneumatic actuator adapted to operate said throttle means from pneumatic signals supplied as a function of a second demand variable; and f. integrating means for effectively controlling the operative actions of said biasing member and said pneumatic actuator for said throttle means to regulate fluid flow in correlation to an integrated function of said first and second demand variables including a predetermined offset of conflicting actions imposed on said throttle means by the respective demand variables.

2. A valve according to claim 1 in which said actuator is operatively responsive to pneumatic signals in the vacuum pressure range.

3. A valve according to claim 1 in which said biasing member and said actuator are inter-connected for said integrating means to effect a mutual interaction therebetween.

4. A valve according to claim 3 in which said throttle means comprises a valve disc cooperating with an annular seat in said passage surrounding said housing inlet, and said biasing member is operative for urging said disc in a first direction relative to said seat and said actuator is operative for urging said disc in an opposite direction relative to said seat.

5. A valve according to claim 4 in which said biasing member comprises a first spring and said actuator comprises an enclosed chamber, a piston operably movable within said chamber in response to receipt of said pneumatic signals, and a second spring located in said chamber acting against said piston in opposition to the movement imposed by said received pneumatic signals.

6. A valve according to claim 5 in which said first spring is maintained in compression for urging said disc toward a closing relation with said seat and said actuator operates in response to its received signals to vary the degree of compression imposed by said first spring against said disc.

7. A valve according to claim 4 including a flexible diaphragm member supporting said disc for movement toward and away from said seat, said diaphragm member being operably engaged on one surface by said biasing member and adapted to be operably engaged on the opposite surface by fluid pressure in said passage acting to oppose urging of said disc by said biasing member.

8. A valve according to claim 5 in which said biasing member comprises a spring and said actuator comprises on enclosed chamber at least a portion of which is defined by said diaphragm.

9. A valve according to claim 1 including condition responsive means operative to alter the effective level of pneumatic signal supplied to said actuator as a function of a remote condition variable.

10. A valve according to claim 9 in which said condition responsive means comprises a variable bleed connected to said actuator in parallel with the supplied pneumatic signal for controllably offsetting the effective level of said supplied signal.

11. A valve according to claim 10 in which said condition responsive means comprises a temperature sensitive element operable to vary said bleed in accordance with temperature change to which it is sensitive.

* * * * *